(12) United States Patent
Moriyama et al.

(10) Patent No.: US 9,179,069 B2
(45) Date of Patent: Nov. 3, 2015

(54) PHOTOGRAPHING DEVICE, PORTABLE INFORMATION PROCESSING TERMINAL, MONITOR DISPLAY METHOD FOR PHOTOGRAPHING DEVICE, AND PROGRAM

(75) Inventors: Takashi Moriyama, Tokyo (JP); Takayuki Sakanaba, Tokyo (JP)

(73) Assignee: LENOVO INNOVATIONS LIMITED (HONG KONG), Quarry Bay (HK)

( * ) Notice: Subject to any disclaimer, the term of this patent is extended or adjusted under 35 U.S.C. 154(b) by 519 days.

(21) Appl. No.: 12/991,394

(22) PCT Filed: May 20, 2009

(86) PCT No.: PCT/JP2009/059634
§ 371 (c)(1),
(2), (4) Date: Nov. 5, 2010

(87) PCT Pub. No.: WO2009/142327
PCT Pub. Date: Nov. 26, 2009

(65) Prior Publication Data
US 2011/0058015 A1    Mar. 10, 2011

(30) Foreign Application Priority Data
May 20, 2008  (JP) ................................. 2008-131440

(51) Int. Cl.
*H04N 5/225*    (2006.01)
*H04N 5/232*    (2006.01)
(Continued)

(52) U.S. Cl.
CPC ............ *H04N 5/23293* (2013.01); *G03B 17/18* (2013.01); *G03B 37/00* (2013.01); *H04N 5/23238* (2013.01)

(58) Field of Classification Search
CPC .................................................. H04N 5/23238
USPC ....................... 348/135–161, 208.99–208.16
See application file for complete search history.

(56) References Cited

U.S. PATENT DOCUMENTS

| 6,466,701 | B1 | 10/2002 | Ejiri et al. |
| 2003/0035047 | A1* | 2/2003 | Katayama et al. .............. 348/47 |
| 2004/0189849 | A1 | 9/2004 | Hofer |

(Continued)

FOREIGN PATENT DOCUMENTS

| JP | 3-280672 | 12/1991 |
| JP | 8-265633 A | 10/1996 |

(Continued)

OTHER PUBLICATIONS

International Search Report for PCT/JP2009/059634 mailed Jun. 30, 2009.

*Primary Examiner* — Christopher S Kelley
*Assistant Examiner* — Jonathan Messmore

(57) ABSTRACT

A photographing device includes a display unit, a movement detection unit and a display control unit. The display unit displays a preview image of being a target to photograph. The movement detection unit detects the preview image being moving from status at which the preview has been photographed as a reference photographed image. The display control unit displays a reference line on the preview image. The reference line has been set in the reference photographed image. The display control unit changes a display position and a direction of the reference line in the display unit based on a detected result by the movement detection unit.

7 Claims, 11 Drawing Sheets

(51) Int. Cl.
  *G03B 17/18*  (2006.01)
  *G03B 37/00*  (2006.01)

(56) References Cited

U.S. PATENT DOCUMENTS

| | | |
|---|---|---|
| 2005/0088542 A1 | 4/2005 | Stavely et al. |
| 2005/0168594 A1 | 8/2005 | Larson |
| 2008/0204566 A1* | 8/2008 | Yamazaki et al. ....... 348/208.99 |

FOREIGN PATENT DOCUMENTS

| | | |
|---|---|---|
| JP | 2002271654 A | 9/2002 |
| JP | 2004138737 A | 5/2004 |
| JP | 2006020111 A | 1/2006 |
| JP | 2006129391 A | 5/2006 |
| JP | 2006217478 A | 8/2006 |
| JP | 5110912 | 9/2008 |
| WO | 2007029740 A | 3/2007 |

* cited by examiner

Fig.3
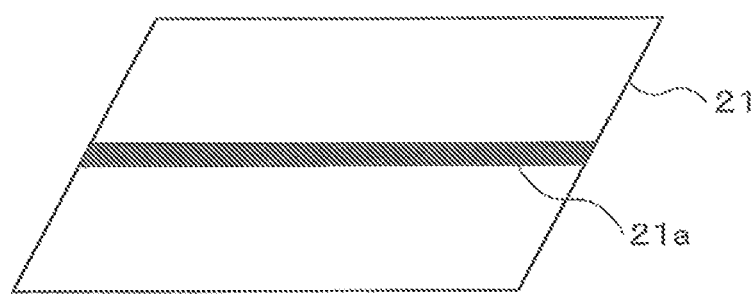
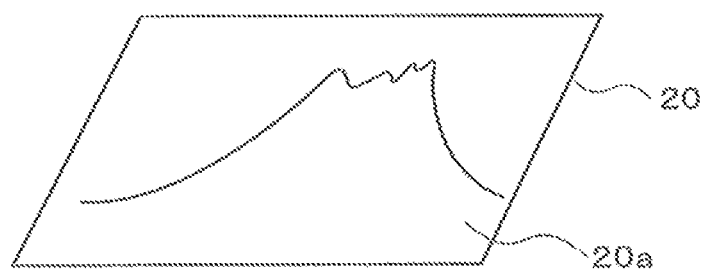

PHOTOGRAPHING DEVICE, PORTABLE INFORMATION PROCESSING TERMINAL, MONITOR DISPLAY METHOD FOR PHOTOGRAPHING DEVICE, AND PROGRAM

CROSS REFERENCE TO RELATED APPLICATIONS

This application is the National Phase of PCT/JP2009/059634, filed May 20, 2009, which is based upon and claims the benefit of priority from Japanese Patent Application No. 2008-131440 filed on May 20, 2008, the disclosure of which is incorporated herein in its entirety by reference.

TECHNICAL FIELD

The present invention relates to a photographing device with which panoramic photographing can be easily performed, a portable information processing terminal, a monitor display method for a photographing device, and a program.

BACKGROUND ART

In a photographing device such as a digital camera, or the like, some device has a panoramic photographing function to take a wide-angle image (panoramic image). For example, the panoramic image is obtained by combining a plurality of successive photographed images which are photographed (photographed for a panoramic image) by a photographer's operation while moving a photographing area of a photographing device to right and left or rotating it. The panoramic photographing function is a function to obtain such plurality of successive photographed images.

By the way, when the panoramic photographing is performed, it is necessary to reduce a vertical shift of the photographed image in that photographing. However, it is difficult for the photographer to recognize the vertical shift when horizontally moving or rotating the photographing device. Therefore, the vertical shift may occur between the successive photograph images while moving or rotating operation. A problem, in which when exceeding a shift value allowed to obtain the panoramic image that is set in the photographing device, the creation of the panoramic image results in failure, occurs.

In order to solve the problem, a patent document 1 discloses a technology in which the panoramic photographing is properly performed by taking a previous photograph image and a successive photograph image of which the panoramic image is composed in a state in which two images are adjacent to each other. Specifically, first, a camera disclosed in the patent document 1 stores a position of a photographing frame having a rectangular frame shape that is a photographing area of the previous image as an absolute value based on a detected result of a triaxial acceleration sensor in the photographing of the previous image. After that, when the next image is photographed, the photographing frame in which the previous photograph image has been taken and the photographing frame indicating the photographing area of the next image are simultaneously displayed in a monitor device of the camera based on the detected result of the acceleration detected by the triaxial acceleration sensor. By using this, the photographer can recognize the difference between the position of the photographing frame in which the previous photograph image has been taken and the position of the photographing frame. Therefore, the photographer can appropriately photograph continuous images.

CITATION LIST

Patent Literature 1: Japanese Patent Application Laid-Open No. 2006-20111.

SUMMARY OF INVENTION

Technical Problem

However, in the technology disclosed in the patent document 1, the photographing frame in which the previous photograph image has been taken and the photographing frame indicating the photographing area of the next image are displayed in a rectangular frame shape, respectively. Consequently, a problem, in which it is difficult for the photographer to recognize a landscape to be photographed, occurs because a lot of lines are displayed in a monitor device. In particular, a screen of a monitor device included in a digital camera or a mobile phone is very small. Therefore, a problem, in which a display of the above-mentioned frame becomes an eyesore, occurs.

An object of the present invention is to provide a technology to solve the above-mentioned problem. Namely, the object of the present invention is to provide a photographing device, a portable information processing terminal, a monitor display method for a photographing device, and a program, which can more easily perform a panoramic photographing by simplifying a monitor display while photographing the panoramic image.

Solution to Problem

The photographing device of the present invention includes:
 monitor means for displaying an image obtained through a lens on a screen as a preview image;
 movement detection means for detecting a movement of a photographing area from a position at which the image in the photographing area displayed as the preview image has been photographed as a reference photographed image and outputting the detected result as a movement detection signal; and
 monitor control means for making the monitor means display a predetermined reference line set in an area including an outline of the reference photographed image together with the preview image;
 wherein the monitor control means changes a position and a direction of the reference line in the monitor means based on the movement detection signal.

A portable information processing terminal of the present invention includes:
 the photographing device of the present invention.

A monitor display method for a photographing device includes:
 detecting a movement of a photographing area from a position at which an image obtained through a lens has been photographed as a reference photographed image and
 displaying a predetermined reference line set in an area including an outline of the reference photographed image together with a preview image in monitor means for displaying the image obtained through the lens as the preview image, while changing a display position and a direction based on a detected result of movement of the photographing area.

A program for providing a photographing device a function, the function includes:

a function that detects a movement of a photographing area from a position at which an image obtained through a lens has been photographed as a reference photographed image, and a function that displays a predetermined reference line set in an area including the periphery of the reference photographed image together with a preview image in monitor means for displaying the image obtained through the lens as the preview image, while changing a position and a direction based on a detected result of movement of the photographing area.

Advantageous Effects of Invention

According to the present invention, the monitor display can be simplified while photographing the panoramic image. As a result, a plurality of images suitable for a panoramic image creation can be more easily photographed.

FIG. b is a diagram representing an example of a state in which a display position of the middle line in the monitor unit is changed.

FIG. 3 is a diagram representing a display configuration of the monitor unit.

Figure 4:
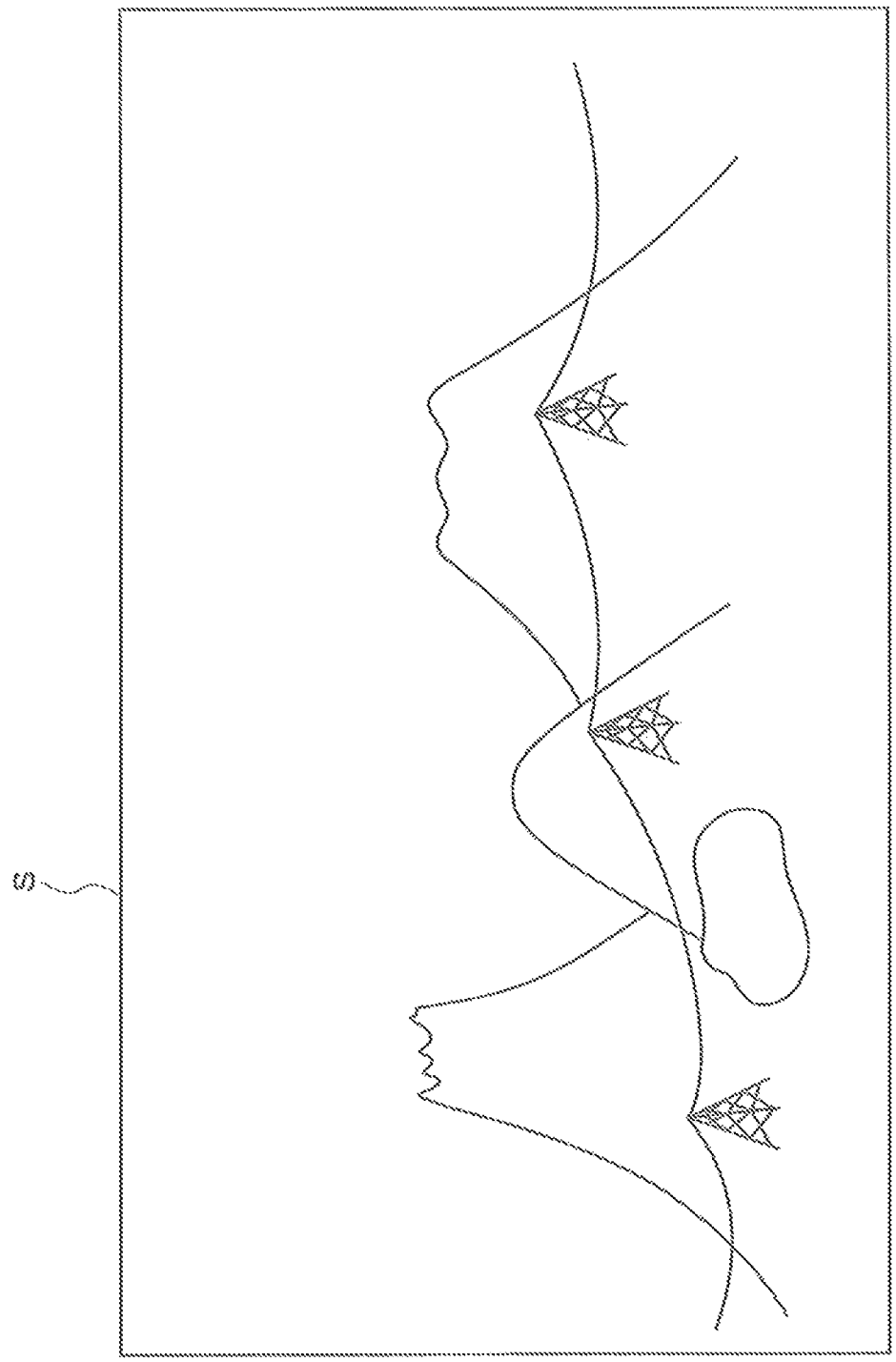

FIG. 4 is a diagram representing one example of a landscape that is an object.

Figure 5:
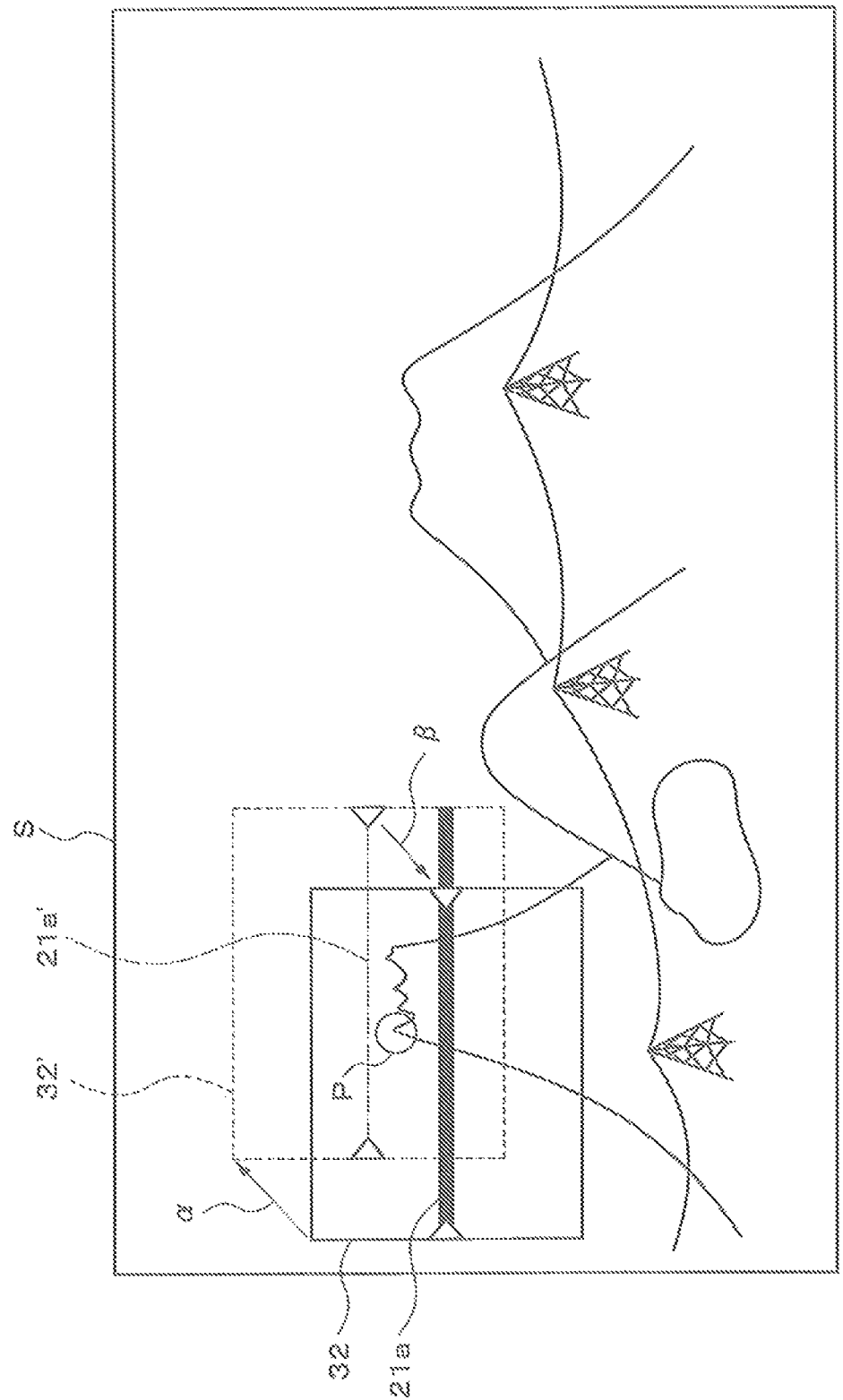

FIG. 5 is a diagram explaining one example of a photographing area in the landscape that is an object.

Figure 6:
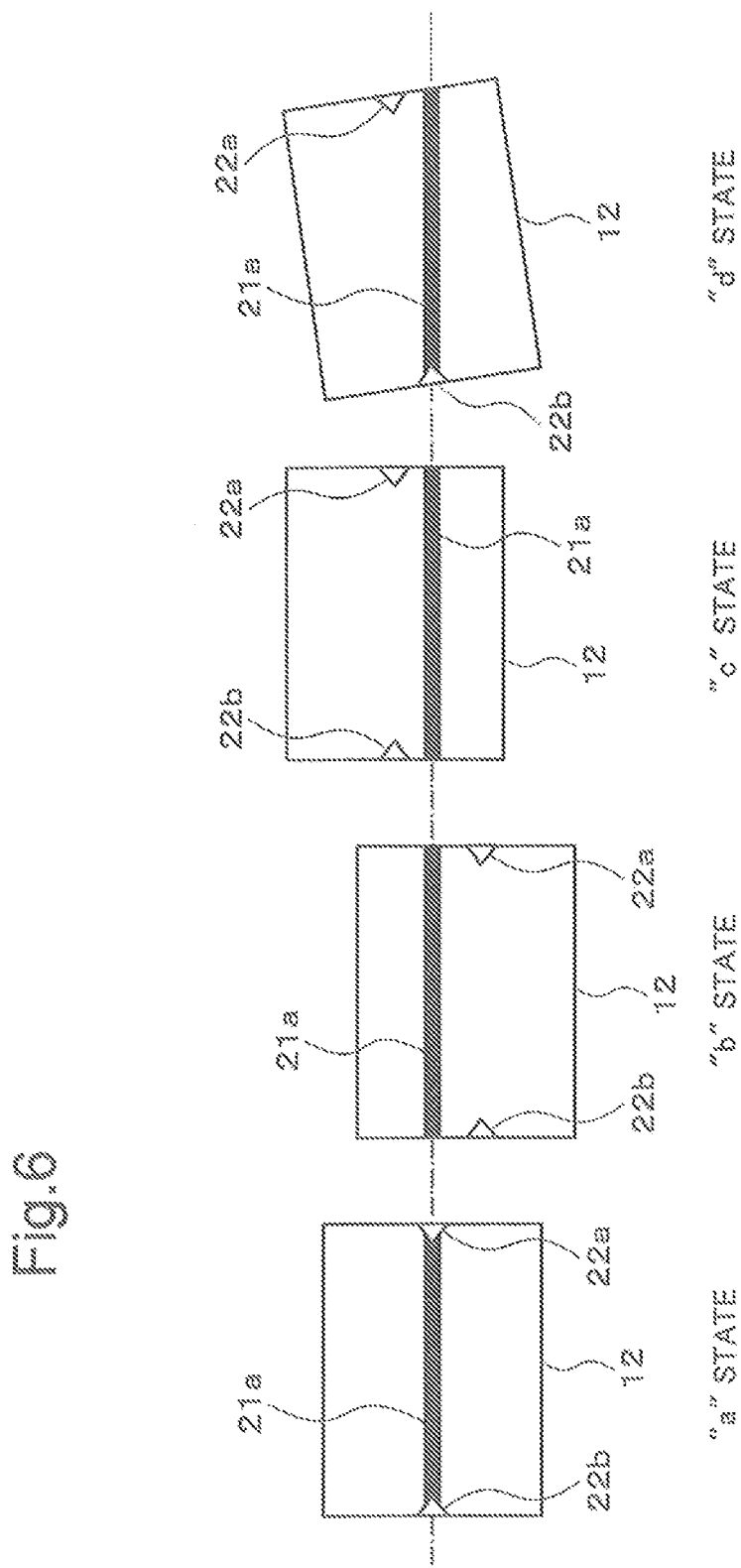

FIG. 6 is a diagram representing an example of a change in the display position of the middle line in the monitor unit.

Figure 7:
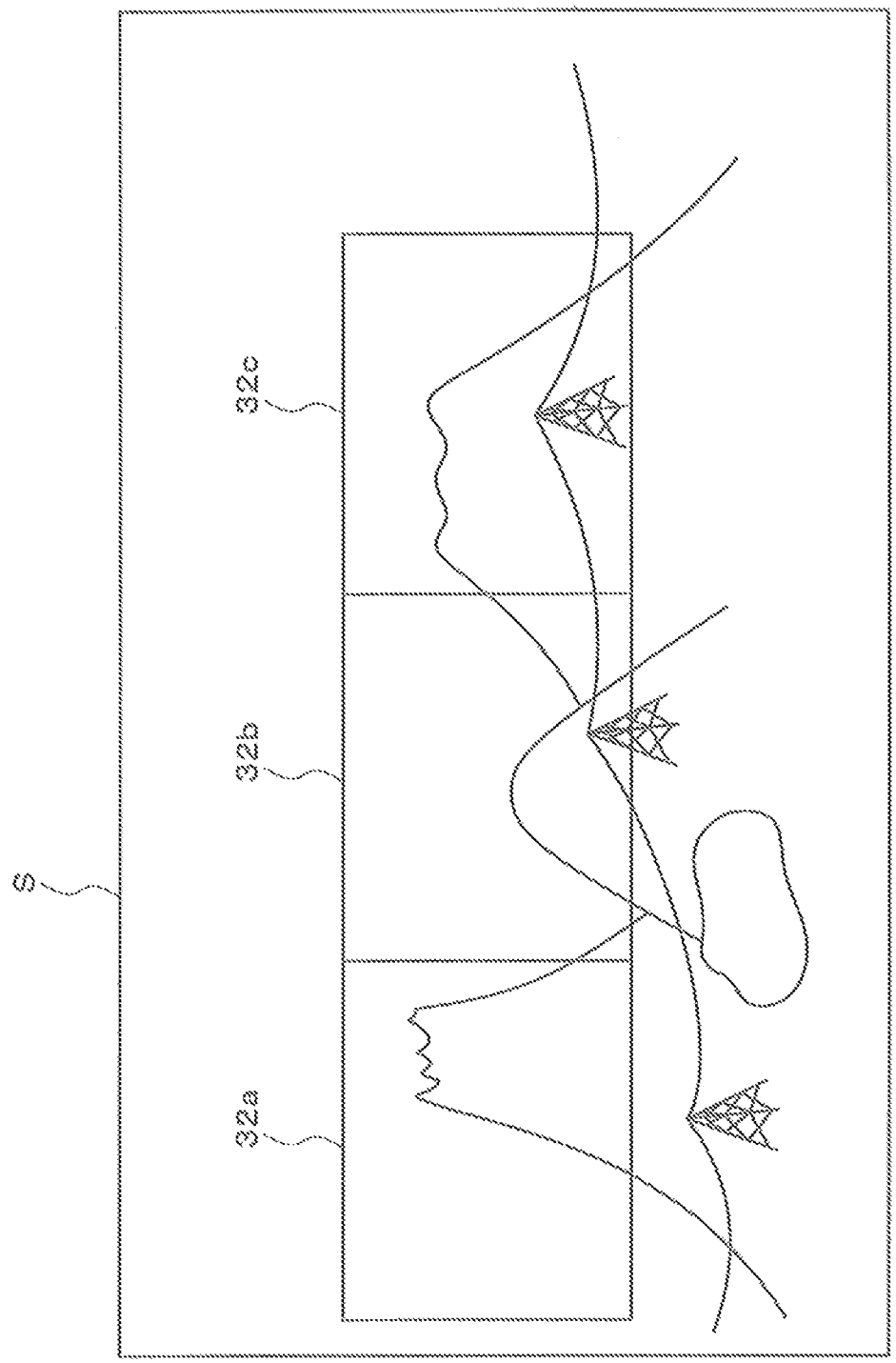

FIG. 7 is a diagram representing an example of photographing the landscape that is an object.

Figure 8:
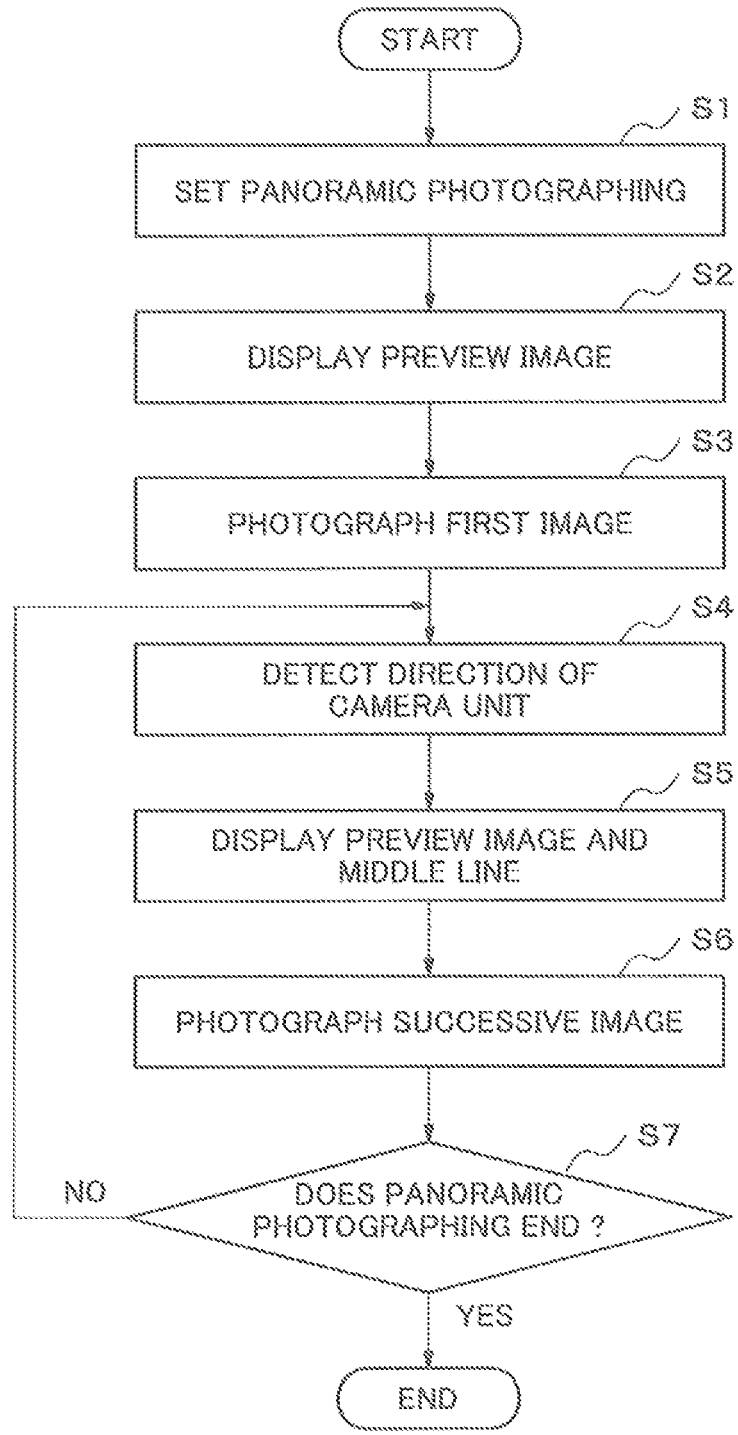

FIG. 8 is a, flowchart representing an example of the operation of the photographing device of the first exemplary embodiment.

Figure 9:
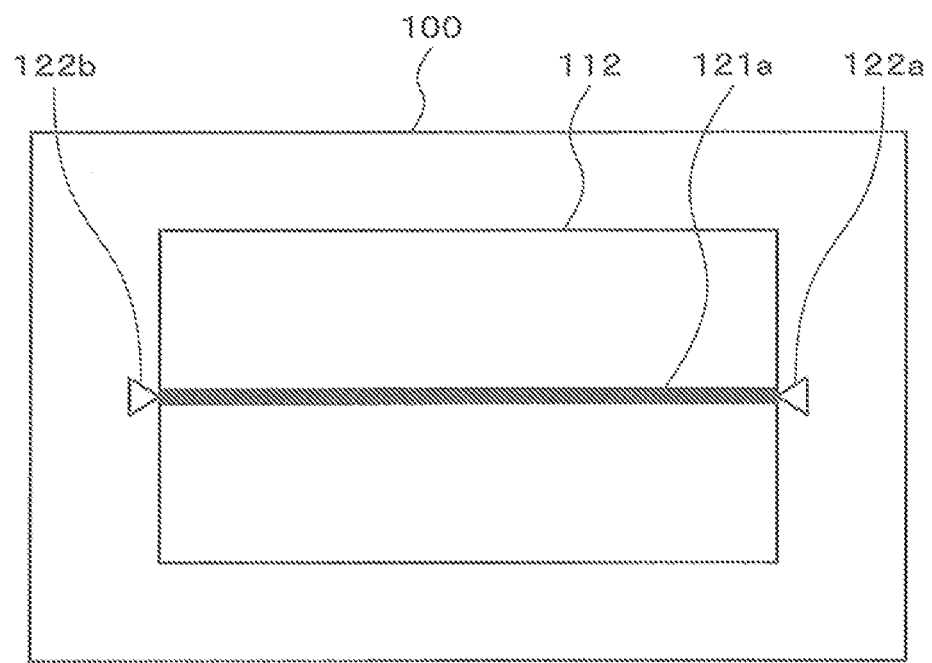

FIG. 9 is a diagram representing an example of modification of the photographing device of the first exemplary embodiment.

Figure 10:
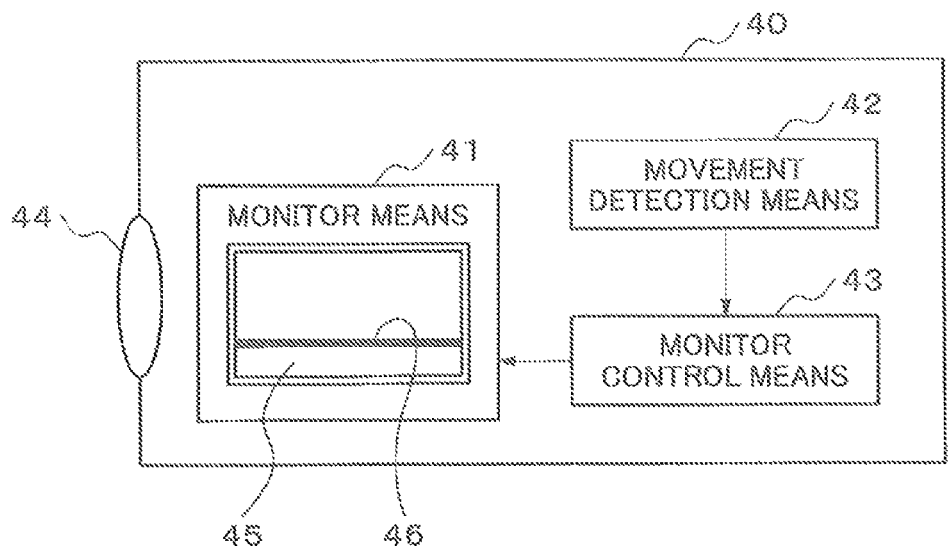

FIG. 10 is a diagram explaining a second exemplary embodiment.

Figure 11:
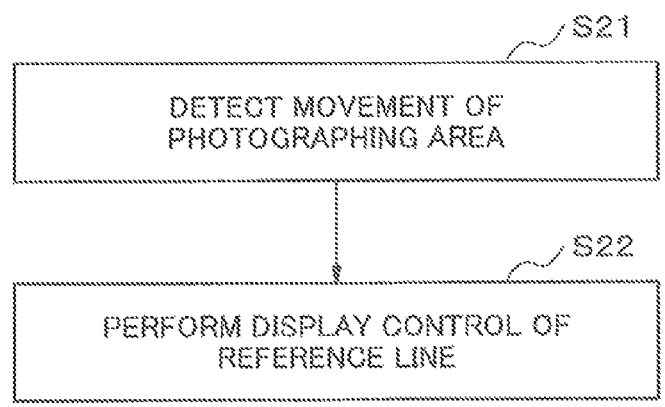

FIG. 11 is a diagram explaining a monitor display method for the photographing device of the second exemplary embodiment.

Figure 12:
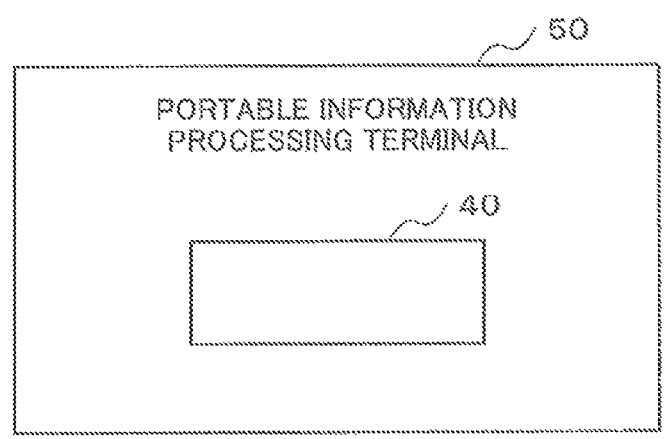

FIG. 12 is a diagram representing simply a portable information processing terminal including the photographing device of the second exemplary embodiment.

Figure 13:
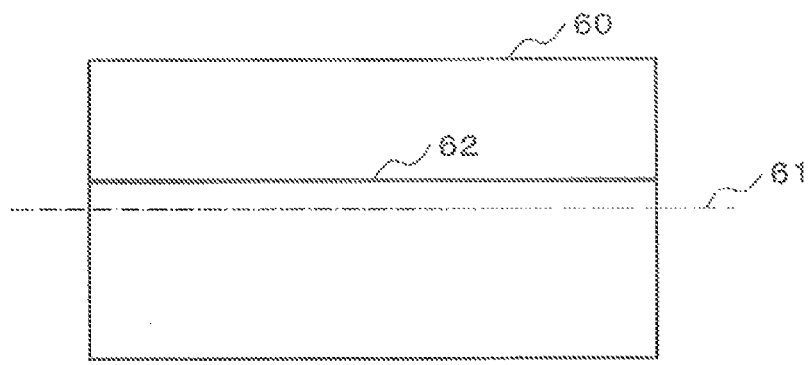

FIG. 13 is a diagram representing an example of another form of the reference line.

Figure 14:
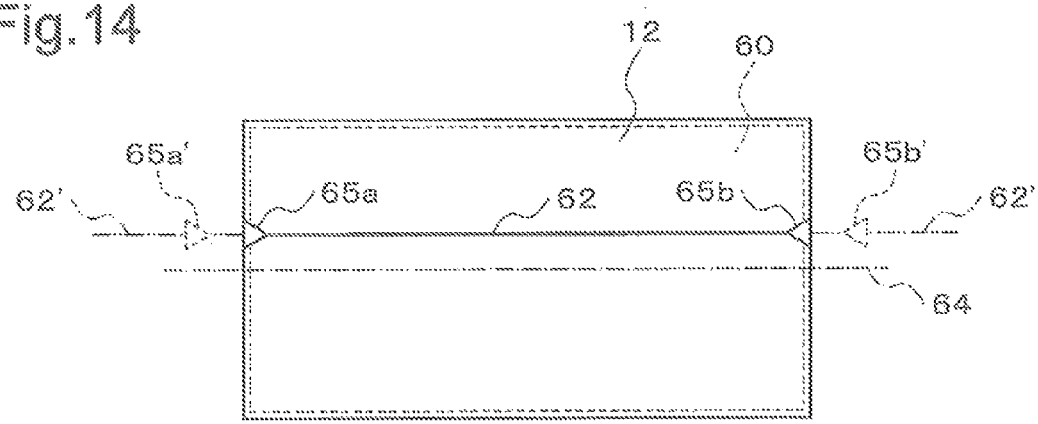

FIG. 14 is a diagram representing an example of another form of a reference mark.

Figure 15:
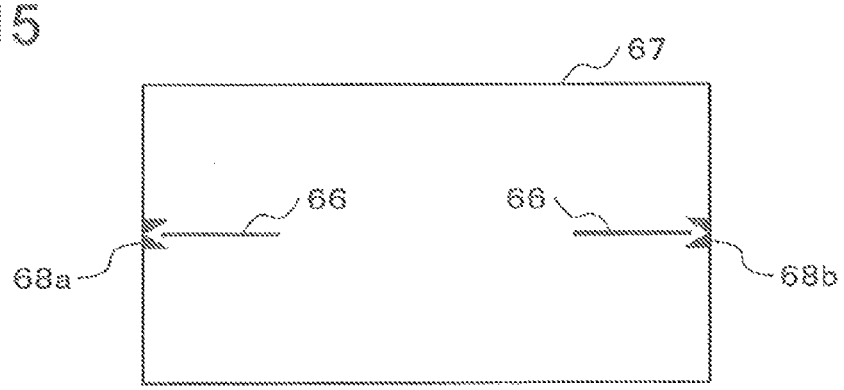

FIG. 15 is a diagram representing an example of further another form of the reference line and the reference mark.

DESCRIPTION OF EMBODIMENTS

The exemplary embodiment of the present invention will be described below based on the drawings.

First Exemplary Embodiment

First, the outline of the first exemplary embodiment will be described.

A photographing device of the first exemplary embodiment includes a camera unit with a lens to take an image, a monitor unit, a monitor control unit with which the image taken by the camera unit at a constant time interval is displayed in the monitor unit as a preview image, and a photographing control unit which performs photographing based on the image taken by the camera unit and stores the rectangular photograph image.

Further, this photographing device includes direction detection means for detecting the change in the direction to the direction of the camera unit when the photograph image has previously been photographed by the photographing control unit. The monitor control unit displays the preview image taken by the camera unit in the monitor unit and also displays the middle line, which indicates a center in one side direction of the periphery of the photograph image that has previously been photographed by the photographing control unit, is perpendicular to the one side direction and has a predetermined length in the monitor unit, while changing it in accordance with the change in the direction of the camera unit detected by the direction detection means.

Additionally, in the photographing device, the monitor control unit displays the middle line in the monitor unit, while changing it in the opposite direction of the change in the direction of the camera Unit that is detected by the direction detection means.

Further, in the photographing device, the middle line is a line indicating a center in a short side direction or a long side direction of the rectangular photograph image which has previously been photographed by the photographing control unit.

Further, in the photographing device, the monitor control unit extends the middle line so that the both ends thereof reach the periphery of the monitor unit and displays it.

Further, in the photographing device, the monitor control unit displays the middle mark indicating the center in the short side direction or the long side direction of the monitor unit of rectangular shape together with the preview image and the middle line in the monitor unit.

Additionally, in the photographing device, the monitor control unit displays the middle mark near the both short sides or the both long sides of the periphery of the monitor unit.

Additionally, in the photographing device, the direction detection means detects the change in the direction of the camera unit based on the change in the position and a rotational direction of a feature part by tracking the feature part that is the same as the predetermined feature part in the photograph image that has previously been photographed by the photographing control unit in the image taken by the camera unit.

The photographing device displays the image taken by the camera unit at a constant time interval in the monitor unit as the preview image as a basic function. Further, when a photographing instruction such as pressing down of a shutter or the like is inputted, the photographing device stores the image taken by the camera unit as the photograph image at that moment. When the panoramic photographing is performed, the photographing device displays the middle line together with the preview image in the monitor unit. The middle line is a center line in the short side of the rectangular photograph image that has previously been photographed and it is displayed in the monitor unit while changing in accordance with the detected change in the direction of the camera unit. Specifically, the photographing device displays the middle line (center line) along the transverse direction of the photograph image, which has previously been photographed in the monitor unit, while changing it in the opposite direction of the change in the direction of the camera unit. As a result, the middle line is displayed in the monitor unit without changing the position and the direction to the object at the time of the previous photographing. In other words, the middle line to the object is displayed at an absolute position in the monitor unit.

Therefore, when the photographer (operator of the photographing device) performs a photographing by using the middle line as a guide, the photographer can visually correct a positional shift in a vertical direction of the camera unit to the previous image. As a result, a plurality of images which have no shift in the vertical direction with each other can be easily photographed. In this photographing, a auxiliary figure that is displayed in the preview image to facilitate the shift correction is only the middle line. Therefore, the preview image can be easily viewed. In other words, the interference of the figure to facilitate the shift correction with the photographing performed by the photographer can be prevented. The shift can be more easily corrected by displaying the middle mark for the alignment in the monitor unit.

The photographing device may be included in the portable information processing terminal. In other words, the portable information processing terminal having the photographing device includes the camera unit with a lens to take an image, the monitor unit, the monitor control unit which displays the image taken by the camera unit at a constant time interval as the preview image in the monitor unit, and the photographing control unit which performs photographing based on the image taken by the camera unit and stores the rectangular photograph image.

Further, this portable information processing terminal includes direction detection means for detecting the change in the direction to the direction of the camera unit when the photograph image has been photographed by the photographing control unit. The monitor control unit displays the preview image taken by the camera unit in the monitor unit and also displays the middle line that indicates a center in one side direction of the periphery of the photograph image that has been photographed by the photographing control unit, is perpendicular to the one side direction and has a predetermined length in the monitor unit, while changing it in accordance with the changes in the direction of the camera unit detected by the direction detection means.

Further, the monitor control unit displays the middle line while changing it in the opposite direction of the change in the direction of the camera unit that is detected by the direction detection means.

The photographing device includes the following program. The program achieves the monitor control unit which displays the image taken by the camera unit at a constant time interval in the monitor unit as the preview image, the photographing control unit which performs photographing based on the image taken by the camera unit and stores the rectangular photograph image, and direction detection means for detecting the change in the direction to the direction of the camera unit when the photograph image has been photographed by the photographing control unit in the photographing device including the camera unit having the lens to take the image and the monitor unit.

The monitor control unit displays the preview image taken by the camera unit in the monitor unit and also displays the middle line that indicates the center in one side direction of the periphery of the photograph image that has been photographed by the photographing control unit, is perpendicular to the one side direction and has a predetermined length in the monitor unit, while changing it in accordance with the changes in the direction of the camera unit that is detected by the direction detection means.

By the program, the monitor control unit displays the middle line while changing it in the opposite direction of the change in the direction of the camera unit that is detected by the direction detection means.

The photographing method by the photographing device includes a monitor control step of displaying the image taken by the camera unit at a constant time interval in the monitor unit as the preview image and a photographing control step of performing photographing based on the image taken by the camera unit and storing the rectangular photograph image and also includes, after the photographing control step in which the photograph image has previously been photographed, a direction detection step of detecting the change in the direction to the direction of the camera unit when the photograph image has previously been photographed in the photographing control step and a middle line display step of displaying the middle line that indicates the center in one side direction of the periphery of the previous photograph image that has been photographed in the photographing control step, is perpendicular to the one side direction and has a predetermined length in the monitor unit while changing it in accordance with the changes in the direction of the camera unit that is detected in the direction detection step.

In the middle line display step of the photographing method, the middle line is displayed while changing it in the opposite direction of the change in the direction of the camera unit that is detected in the direction detection step.

Hereinafter, the first exemplary embodiment will be described in detail with reference to FIG. 1 to FIG. 9. In addition, in an explanation of the first exemplary embodiment, a digital camera is taken as one example of the photographing device. However, the first exemplary embodiment can be applied to any portable information processing terminal such as a mobile phone having a photographing function.

Figure 1:
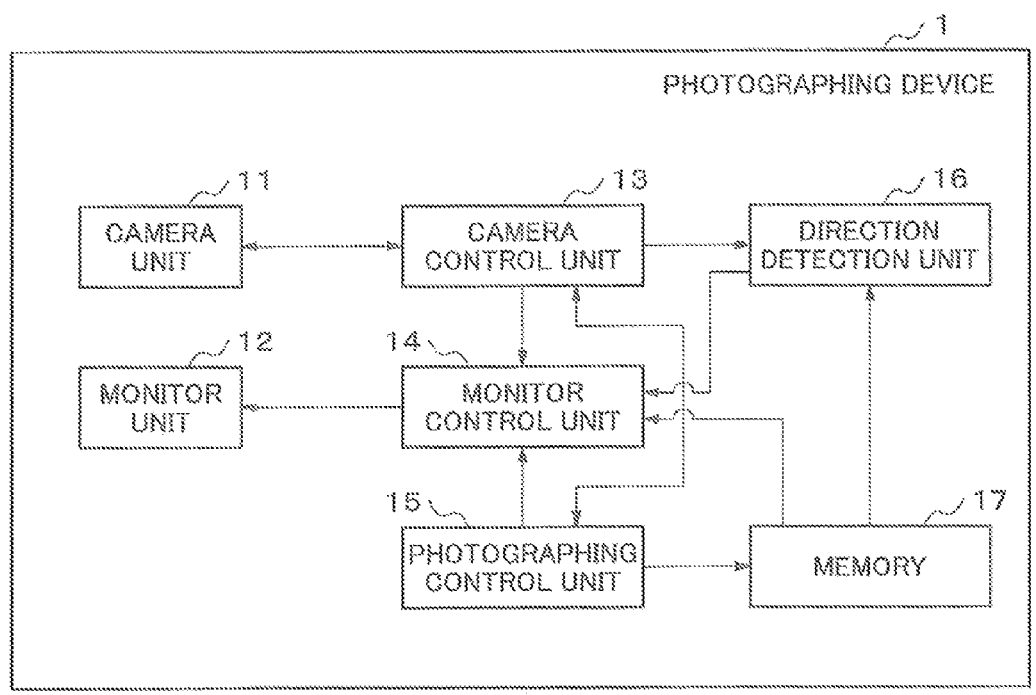
FIG. 1 is a functional block diagram representing a configuration of a photographing device of a first exemplary embodiment.

FIG. 1 is a functional block diagram representing a configuration of the photographing device of the first exemplary embodiment. FIG. 2a to FIG. 7 are diagrams representing a state of the display of the monitor unit. FIG. 8 is a flowchart representing an example of the operation of the photographing device. FIG. 9 is a diagram representing an example of modification of the photographing device.

[Configuration]

As shown in FIG. 1, the photographing device 1 of the first exemplary embodiment is, for example, a digital camera. The photographing device 1 includes a camera unit 11 with a lens to take an image and further includes a monitor unit (monitor means) 12 to displays the image taken by the camera unit 11. The photographing device 1 furthermore includes a camera control unit 13, a monitor control unit (monitor control means) 14, a photographing control unit 15, and a direction detection unit (movement detection means) 16. These configuration units 13 to 16 are structured by installing a program in a calculation device equipped in the photographing device 1. Additionally, the photographing device 1 includes a memory 17 storing the photograph image data and various information. Each configuration will be described in detail below.

First, the camera control unit 13 controls the operation of the camera unit 11 according to an operation instruction of the photographing device 1 that is inputted by an operator. For example, when the camera control unit 13 receives the input of a photographing preparation instruction, it takes the image from the camera unit 11 at a constant time interval and sends the data of the image to the monitor control unit 14 and the photographing control unit 15. Additionally, the camera control unit 13 controls the camera unit 11 so as to automatically set a lens focal point to an object at the time of photographing operation instruction and make it change the lens focal point according to the operation instruction of zooming.

The monitor control unit 14 controls a display operation of the monitor unit 12. For example, when the monitor control unit 14 receives the image taken at a constant time interval from the camera control unit 13 during photographing preparation in the camera unit 11, it makes the monitor unit 12 display the image without any modification as the preview image (through image). In this case, the monitor unit 12 functions as a finder. The monitor control unit 14 makes the monitor unit 12 display the image photographed by the photographing control unit 15 described later. The operator can confirm the photograph image that has been photographed by viewing the display in the monitor unit 12.

The photographing control unit 15 performs photographing based on the image taken by the camera unit 11 according to the input of the photographing instruction such as pressing down of a shutter. Namely, the photographing control unit 15 takes the image taken by the camera unit 11 when the photographing instruction is inputted as the rectangular photograph image data and makes the memory 17 store it.

In addition, the further detailed description of the function of the configuration will be omitted because the function of the configuration is a function that a conventional photographing device has.

The photographing device 1 of the first exemplary embodiment further includes the following configuration and function. That is, the direction detection unit 16 includes a function to detect the direction of the camera unit 11. Specifically, first, the direction detection unit 16 detects the change in the direction from the direction of the camera unit 11 in which a first photograph image (previous photograph image (reference photograph image)) has been photographed to the current direction of the camera unit 11 when the photographing device 1 is in a panoramic photographing mode described later. In other words, the direction detection unit 16 detects an amount of movement or an amount of rotation (change in a direction) of the photographing area of the camera unit 11 from the position at which the first photograph image has been photographed. Further, in this first exemplary embodiment, it is assumed that "direction of the camera unit" includes a direction of an optical axis of the camera unit and a direction of rotation around the optical axis. Therefore, "the change in the direction of the camera unit" can be represented as "the movement in vertical and horizontal directions and/or the change in the rotational direction of the photographing area".

The change in the direction of the camera unit 11 can be detected for example, by tracking a feature part (feature point) that is included in the image taken by the camera unit 11. The specific example will be described with reference to FIG. 4 and FIG. 5. FIG. 4 illustrates a landscape S to be photographed that is an object. FIG. 5 illustrates the landscape S to be photographed and also illustrates an image area in the landscape S to be photographed that is taken by the camera unit 11, that is, the preview image displayed in the monitor unit 12.

First, it is assumed that the image area indicated with a numeral 32 in FIG. 5 is taken by the camera unit 11 and the first photograph image (reference photograph image) has previously been photographed. After that, it is assumed that the direction of the camera unit 11 is changed during the photographing preparation, in other words, while displaying the preview image in the monitor unit 12. As a result, it is assumed that the photographing area of the camera unit 11 is moved to the image area indicated with the numeral 32' in FIG. 5. In this case, a feature part P that is the same as the feature part P in the first photograph image is always detected from the taken image and tracked even when the direction of the camera unit 11 is changed. Then, the amount of the movement or the amount of the rotation of the photographing area of the camera unit 11 can be detected from the movement trajectory. For example, in an example shown in FIG. 5, when the photographing area is moved from the photographing area of the numeral 32 to the photographing area of the numeral 32', the feature part P in the image taken by the camera unit 11 is moved in a lower left direction on the monitor unit 12. It can be detected that the camera unit 11 moves in the upper right direction as shown by a numeral a based on the movement direction of this feature part P. The direction detection unit 16 notifies the monitor control unit 14 of the change in the direction of the camera unit 11 that is detected as described above.

Further, a process tracking the feature part in the image by the direction detection unit 16 can be performed for example, by performing an edge treatment for each image based on brightness information on each pixel in the image and detecting an image part having the same shape in each image after the treatment. In addition, the tracking process of the feature point may be carried out by using any existing image treatment technology.

Further, the method detecting the change in the direction of the camera unit 11 by the direction detection unit 16 is one example and the change in the direction of the camera unit 11 may be detected by another method. For example, the direction detection unit 16 may equip a triaxial acceleration sensor and detect the amount of the movement or the amount of the rotation (change in the direction) of the photographing area of the camera unit 11 based on the acceleration in each direction detected by this on the basis of the position at which the first photograph image has been photographed.

Figure 2A:
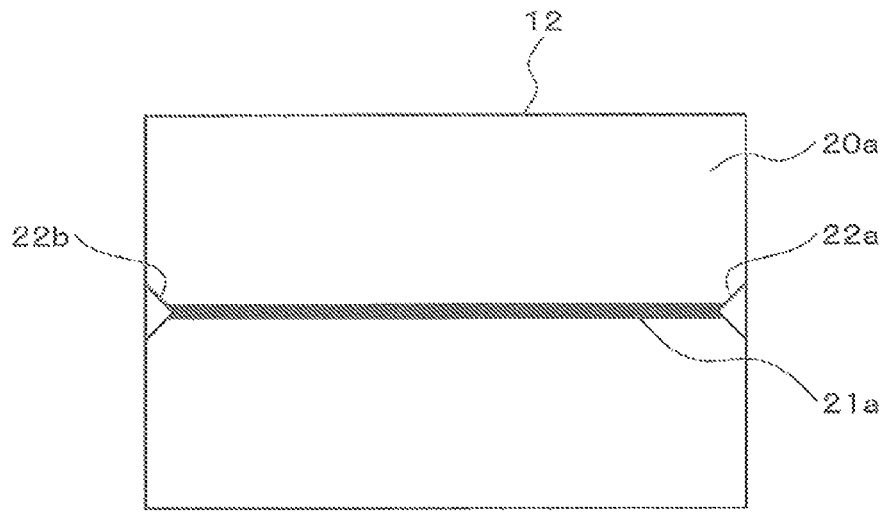
FIG. 2a is a diagram representing an example of a form of a middle line and a middle mark in a monitor unit.
Figure 2B:
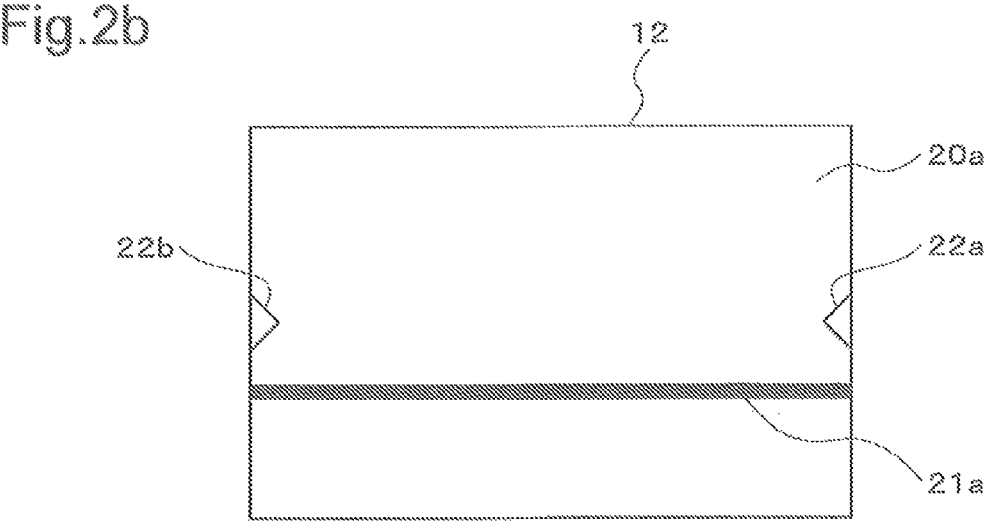

In the first exemplary embodiment, the monitor control unit 14 has also the following function. When the monitor control unit 14 displays the preview image in the monitor unit 12, it simultaneously displays the middle line (center line (reference line)) 21a as shown in FIG. 2a. The middle line 21a is a line which indicates the center of the short side (vertical direction) of the first photograph image (reference photograph image) having a rectangular shape, is perpendicular to the short side, in other words, parallel to the horizontal direction, and has a predetermined length. Further, FIG. 2b illustrates an example of the display of the monitor unit 12 when the direction of the camera unit 11 is changed upward from the direction (state in FIG. 2a) in which the first photograph image (reference photograph image) has been photographed.

Furthermore, the monitor control unit 14 displays the middle marks (reference marks) 22a and 22b as shown in FIG. 2a in the monitor unit 12 in addition to the preview image and the middle line 21a. The middle marks 22a and 22b indicate the center in the vertical direction (short side) of the monitor unit 12. Further, for example, as shown in FIG. 3, the preview image, the middle line 21a, and the middle marks 22a and 22b are displayed in layers 20, 21 and 22, respectively. Those three layers 20, 21 and 22 are overlaid and displayed in the monitor unit 12.

The monitor control unit 14 always displays the middle marks 22a and 22b so that the middle marks are positioned at the center of each of the short sides forming the periphery of the monitor unit 12. On the other hand, the monitor control unit 14 displays the middle line 21a in the monitor unit 12 while changing it in accordance with the change in the direction of the camera unit 11 that is detected by the direction detection unit 16. Specifically, the monitor control unit 14 displays the middle line 21a while changing it in the opposite direction of the change in the direction of the camera unit 11 that is detected. For example, in the example of FIG. 5, the direction detection unit 16 detects that the photographing area of the camera unit 11 has been moved in the upper right direction a from the result of tracking the feature part P. In this case, the display of the middle line 21a' after the movement by the monitor control unit 14 is not the center in the vertical direction of the monitor unit 12 which displays the photographing area 32'. The monitor control unit 14 displays the middle line 21a as follows. Namely, the monitor control unit 14 moves the middle line 21a in a lower left direction β that is an opposite direction of the movement direction α of the camera unit 11 and makes the monitor unit 12 display it. Accordingly, the middle line 21a is displayed without changing the absolute position thereof.

Further, the monitor control unit 14 always extends the both ends of the middle line 21a almost to the periphery of the monitor unit 12 and displays it.

FIG. 6 illustrates an example of the display of the middle line 21a in the monitor unit 12. An "a" state in FIG. 6 is an example of the display of the monitor unit 12 in a case in which no shift of the camera unit 11 in the vertical direction (short side direction) from the position at which the first photograph image has been photographed occurs. In this case, the middle marks 22a and 22b in the right and left sides are displayed at the center and also the middle line 21a is located at the center in the vertical direction. When the shutter is pressed down in such state, the photograph image having no shift in the vertical direction to the first photograph image can be taken.

A "b" state in FIG. 6 is an example of the display of the monitor unit 12 in a case in which the camera unit 11 is shifted toward a lower direction from the position at which the first photograph image has been photographed. In this case, the middle marks 22a and 22b in the right and left sides are displayed at the center but the middle line 21 a is displayed at the position that is shifted the upper direction from the center in the vertical direction. In such case, the operator moves the photographing area of the camera unit 11 in the upper direction. By this operation, the middle line 21a is reversely moved in the lower direction and displayed in the monitor unit 12. When the operator aligns the both ends of the middle line 21a with the center marks 22a and 22b like the "a" state, the shift in the vertical direction can be restrained.

A "c" state in FIG. 6 is an example of the display of the monitor unit 12 in a case in which the camera unit 11 is shifted toward an upper direction from the position at which the first photograph image has been photographed. In this case, the center marks 22a and 22b in the right and left sides are displayed at the center but the middle line 21a is displayed at the position that is shifted toward the lower direction from the center in the vertical direction. In such case, the operator moves the photographing area of the camera unit 11 in the lower direction. By this operation, the middle line 21a is reversely moved in the upper direction and displayed in the monitor unit 12. When the operator aligns the both ends of the middle line 21a with the center marks 22a and 22b like the "a" state, the shift in the vertical direction can be restrained.

A "d" state in FIG. 6 is a case in which the camera unit 11 is rotated to the left (in the counterclockwise direction) from the position at which the first photograph image has been photographed. In this case, the center marks 22a and 22b in the right and left sides are located at the center and displayed in the monitor unit 12 but the middle line 21a is rotated to the right (in the clockwise direction) and displayed in a slanted state. In such case, the operator rotates the photographing area of the camera unit 11 to the right (in the clockwise direction). By this operation, the middle line 21a is reversely rotated to the left (in the counterclockwise direction) and displayed in the monitor unit 12. When the operator aligns the both ends of the middle line 21 a with the center marks 22a and 22b like the "a" state, the shift in the vertical direction can be restrained.

On the basis of the above-mentioned description, after the operator takes a first photograph image (reference photograph image) 32a shown in FIG. 7, the operator can take a second photograph image 32b with no vertical shift to the first photograph image 32a. Similarly, the operator can take a next third photograph image 32c with no vertical shift to the first photograph image 32a. Further, a function to generate the panoramic image by joining these images may be provided in the photographing device 1 or the process of generating the panoramic image may be carried out in another computer.

[Operation]

Next, the operation of the photographing device 1 having the above-mentioned configuration will be described with reference to a flowchart shown in FIG. 8. When the operator inputs a panoramic photographing instruction by operating an operation unit of the photographing device 1, the photographing device 1 sets a mode thereof to a panoramic photographing mode (step S1). The photographing device 1 becomes the photographing preparation state. Namely, the photographing device 1 continuously displays the image taken by the camera unit 11 at a constant time interval in the monitor unit 12 as the preview image (step S2, monitor control step). When a photographing instruction is inputted by operation of the operator such as pressing down a shutter, the photographing device 1 photographs the image taken by the camera unit 11 as the photograph image at that moment and stores it in the memory 17 (step S3, photographing control step). By this operation, the first photograph image is photographed and the middle line in the vertical direction of the first photograph image is set as the reference to correct the vertical shift caused in the photographing performed after that time.

After that, the photographing device 1 becomes in the photographing preparation state to photograph the next photograph image. In other words, the photographing device 1 continuously displays the image taken by the camera unit 11 at a constant time interval in the monitor unit 12 as the preview image once again. At that time, the photographing device 1 extracts a feature part that is the same as the feature part in the first photograph image stored in the memory 17 at a constant time interval from the preview image and tracks it. The photographing device 1 detects the movement and the change in the rotational direction of the feature part. The photographing device 1 detects the change in the direction of the camera unit 11 to the direction of the camera unit 11 in which the first photograph image has been photographed based on this detected result (step S4, direction detection step). The photographing device 1 displays the center marks 22a and 22b, and the middle line 21a whose display position is changed in accordance with the change in the detected direction together with the preview image in the monitor unit 12 (step S5, middle line display step).

When the both ends of the middle line 21a are shifted from the middle marks 22a and 22b, the operator corrects the shift in the vertical direction by moving or rotating the photographing area, that is, the direction of the camera unit 11, so that the positions of them are aligned. After that, when the shutter is pressed down, the photographing device 1 photographs the successive photograph image (step S6).

When the panoramic photographing is continued ("NO" in step S7), the process after the above-mentioned step S4 is repeated. Namely, the middle line 21a of the first photograph image is displayed together with the preview image and the center marks 22a and 22b at the absolute position in the monitor unit 12. By this operation, the operator can correct the shift in the vertical direction by referring to the position of the middle line 21a and the middle marks 22a and 22b. The operator can photograph the successive photograph image.

As mentioned above, in the first exemplary embodiment, the operator can visually correct the shift of the position of the camera unit 11 from the position at which the previous photograph image has been photographed and can easily photograph a plurality of images with no shift. Furthermore, in the first exemplary embodiment, the auxiliary figure to correct the shift that is displayed in the monitor unit 12, in other words, on the preview image is only the middle line. Therefore, the interference of the figure to correct the shift displayed on the preview image with the photographing performed by the photographer can be prevented. As a result, the appropriate panoramic image can be more easily photographed.

Further, in the first exemplary embodiment, the middle marks 22a and 22b are displayed near the periphery (outline of a screen) of the monitor unit 12. However, the position at which the middle marks 22a and 22b are displayed is not necessarily limited to near the periphery of the monitor unit 12. Further, it is not necessary to display the middle marks 22a and 22b.

As mentioned above, the middle marks 22a and 22b are displayed at the center of each of the short sides of the monitor unit 12 regardless of the direction of the camera unit 11. Therefore, the middle marks 22a and 22b may be provided on the outside of the monitor unit 12. Namely, as shown in FIG. 9, middle marks 122a and 122b may be marked on the case surface part from the short side of a monitor unit 112 of a photographing device 100 to the outside. Even when used this way, the shift in the vertical direction of the photograph image can be corrected by aligning the both ends of a middle line 121a displayed in the monitor unit 112 with the middle marks 122a and 122b.

Further, in the first exemplary embodiment, the middle line 21a is displayed as a line to indicate the center of the short side (vertical direction) of the monitor unit 12 and the photograph image that are rectangular. However, a line to indicate the center of the long side may be displayed as the middle line. In this case, the middle marks 22a and 22b are displayed at the center of each of the long sides, respectively. As a result, the panoramic photographing in the short side direction (vertical direction) can be performed.

Second Exemplary Embodiment

The second exemplary embodiment will be described below.

As shown in FIG. 10, a photographing device 40 of the second exemplary embodiment includes monitor means 41, movement detection means 42, and monitor control means 43.

The monitor means 41 have a function to display the image taken through a lens 44 in a screen 45 as the preview image.

The movement detection means 42 have a function to output a result of detecting the movement of the photographing area from the position at which the image in the photographing area displayed as the preview image has been photographed as the reference photograph image as the movement detection signal.

The monitor control means 43 have a function to make the monitor means 41 display the preview image and also make it display a predetermined reference line 46 set in an area including the periphery of the reference photograph image. Further, the monitor control means 43 have a function to make the monitor means 41 change a position and a direction of the reference line 46 in the monitor means 41 based on the movement detection signal.

For example, a program for realizing a function to detect the movement of the photographing area as mentioned above and a function with respect to the display of the monitor means 41 is installed in the photographing device 40. The photographing device 40 can have the function to detect the movement of the photographing area and the function with respect to the display of the monitor means 41 when it operates according to the program.

Next, an example of a monitor display method in the photographing device 40 of the second exemplary embodiment will be described. For example, the photographing device 40 detects the movement of the photographing area from the position at which the image taken through the lens 44 has been photographed as the reference photograph image and outputs the detected result as the movement detection signal (step S21 in FIG. 11). On the other hand, the photographing device 40 sets the reference line 46 in the area including the periphery of the reference photograph image. Further, the photographing device 40 displays the reference line 46 together with the preview image in the monitor means 41.

Further, the photographing device 40 changes the position and the direction of the reference line 46 based on the movement detection signal (step S22).

In the photographing device 40 of the second exemplary embodiment, after the reference photograph image has been photographed, when an image consecutive in the reference photograph image is photographed (panoramic photographing is performed), the reference line 46 can be displayed together with the preview image in the monitor means 41. The reference line 46 can support the panoramic photographing. Therefore, the panoramic photographing can be easily made by utilizing the reference line 46. Moreover, in the photographing device 40, in the preview image, a figure to support the panoramic photographing is only the reference line 46. Therefore, the interference of the monitor display figure to support the panoramic photographing with the photographing performed by the photographer can be prevented. As a result, the panoramic photographing becomes more easier.

The photographing device 40 of the second exemplary embodiment may be installed in a portable information processing terminal 50 as shown in FIG. 12. When the portable information processing terminal 50 includes the photographing device 40, it can have the similar effect mentioned above. In other words, the portable information processing terminal 50 can have the effect in which the interference of the monitor display figure to support the panoramic photographing with the photographing performed by the photographer can be prevented and the panoramic photographing becomes more easier.

Further, this invention is not limited to the first and the second exemplary embodiments and the various embodiments can be implemented. Namely, in the first exemplary embodiment, the reference line set based on the reference photograph image (first photograph image (photograph image previously photographed)) is the middle line 21a of the reference photograph image. In contrast, the reference line may be a line set in the area including the periphery of the reference photograph image and for example, as shown in FIG. 13, it may be a line 62 that is not on a center line 61 of a reference photograph image 60. In the first exemplary embodiment, the reference marks are the middle marks 22*a* and 22*b*. In contrast, the middle mark may not be displayed as the reference mark for some reference lines because the display position of the reference mark is determined according to the reference line. Namely, for example, it is assumed that the photographing area (direction of the camera unit 11) is the same as the photographing area in which the reference photograph image (first photograph image) has been photographed. In this case, the reference mark is displayed at the position on the reference line or a virtual extended line thereof. For example, when the reference line 62 that is not on the center line 61 of the reference photograph image 60 is set as shown in FIG. 13, reference marks 65*a* and 65*b* that are not on a center line 64 of the monitor unit 12 are fixedly displayed in the monitor unit 12 as shown in FIG. 14. When the preview image in the monitor unit 12 is the same as the image in the photographing area in which the reference photograph image 60 has been photographed, the reference marks 65*a* and 65*b* are displayed at the position on the reference line 62 in the monitor unit 12. For example, reference marks 65*a'* and 65*b'* indicated with the dotted line in FIG. 14 may be marked outside the monitor unit 12. When the preview image in the monitor unit 12 is the same as the image in the photographing area in which the reference photograph image 60 has been photographed, the reference marks 65*a'* and 65*b'* mark at the position on the extended line 62' of the reference line 62.

Further, in the first and second exemplary embodiments, the reference lines 21*a* and 46 are displayed in a form in which the both ends of the reference lines 21*a* and 46 reach the outline of the monitor unit 12 (screen 45 of the monitor means 41). In contrast, for example, as shown in FIG. 15, the both ends of a reference line 66 need not necessarily reach the outline of a screen 67. Further, the reference line may be divided into a plurality of lines like the reference line 66. Further, although the reference line in each of the first and the second exemplary embodiments is a solid line, the reference lines may be a line other than the solid line such as a dotted line, a dashed-dotted line. As mentioned above, the form of the reference line is not limited to the form shown in each of the first and the second exemplary embodiments and for example, an appropriate form can be used in consideration of being clearly displayed. Even when the form of the reference line is changed to another form other than the form described in each of the first and the second exemplary embodiments, the effect that is the same as the effect obtained in the first and the second exemplary embodiments can be obtained.

Further, in the first exemplary embodiment, the shape of the reference marks (middle marks 22*a* and 22*b*) are a triangle. In contrast, the reference mark may have a shape other than the triangle like reference marks 68*a* and 68*b* shown in FIG. 15. It is not limited to the triangle. Thus, even when a form of the reference mark is a shape other than the triangle shape, the effect that is the same as the effect obtained in the first and the second exemplary embodiments can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be used for not only a photographing device such as a digital camera but also a portable information processing terminal having a photographing function such as a mobile phone with a camera.

The invention claimed is:

1. A photographing device, comprising:
   a display unit that displays a preview image of a target to photograph;
   a movement detection unit that detects the preview image moving from a status in which the preview image has been photographed as a reference photographed image; and
   a display control unit that displays a reference line on the preview image, the reference line having been set in the reference photographed image, including an edge of the reference photographed image;
   wherein:
     the display control unit fixedly displays a reference mark at a predetermined display position of the display unit, or
     the reference mark is put on a frame of the display unit;
   wherein:
     the position of the reference mark is on one of: the reference line, and
     when the preview image is the same as the reference photographed image, on a virtual extended line of the reference line;
   wherein the display control unit changes a display position and a direction of the reference line in the display unit so that a distance between the reference line and the reference mark corresponds to a shift quantity reflecting an amount of shill in which the preview image shifts with respect to the reference photographed image, in a direction orthogonal to the reference line, based on a result detected by the movement detection unit;
   wherein the reference line is a center line of the reference photographed image;
   wherein a center part of the reference line is omitted; and
   wherein the center part of the reference line that is omitted is larger than the part that is shown.

2. The photographing device according to claim 1, wherein the movement of the preview image includes at least one of a movement in a linear direction and a movement in a rotational direction, and
   the display control unit changes the display position of the reference line in a direction opposite to the movement in the linear direction of the preview image and changes the direction of the reference line in a direction opposite to the movement in the rotational direction of the preview image.

3. The photographing device according to claim 1, wherein the display control unit displays the reference line in the display unit with a form in which both ends of the reference line reach an edge of a screen of the display unit.

4. The photographing device according to claim 1, wherein the display position of the reference mark is in a peripheral portion of a screen of the display unit.

5. The photographing device according to claim 1, wherein the movement detection unit detects the movement of the preview image based on a change in a display position of a predetermined image part in the display unit.

6. A photographing device, comprising:
   a display means for displaying a preview image of a target to photograph;
   a movement detection means for detecting the preview image moving from a status in which the preview image has been photographed as a reference photographed image; and a display control means for displaying a reference line on the preview image, the reference line having been set in the reference photographed image, including an edge of the reference photographed image;

wherein:

the display control means fixedly displays a reference mark at a predetermined display position of the display means, or the reference mark is put on a frame of the display means; the position of the reference mark is on one of: the reference line, and when the preview image is the same as the reference photographed image, on a virtual extended line of the reference line;

the display control means changes a display position and a direction of the reference line in the display means so that a distance between the reference line and the reference mark corresponds to a shift quantity reflecting an amount of shift in which the preview image shifts to the reference photographed image, in a direction orthogonal to the reference line, based on a result detected by the movement detection means;

the reference line is a center line of the reference photographed image;

a center part of the reference line is omitted; and wherein the center part of the reference line that is omitted is lamer than the part that is shown.

7. A display method for a photographing device, comprising:

detecting a movement of a preview image, of a target to photograph, from a status in which the preview image has been photographed as a reference photographed image;

displaying a reference line on the preview image, the reference line having been set in the reference photographed image, including an edge of the reference photographed image; and fixedly displaying a reference mark at a predetermined display position of a display, or putting the reference mark on a frame of the display;

wherein:

the position of the reference mark is on one of:
    the reference line, and
    when the preview image is the same as the reference photographed image, on a virtual extended line of the reference line; and a display position and a direction of the reference line is changed so that a distance between the reference line and the reference mark corresponds to a shift quantity reflecting an amount of shift in which the preview image shifts to the reference photographed image, in a direction orthogonal to the reference line, based on the detecting of the movement of the preview image;

the reference line is a center line of the reference photographed image:

a center part of the reference line is omitted; and wherein the center part of the reference line that is omitted is lamer than the part that is shown.

* * * * *